(12) United States Patent
Kumano

(10) Patent No.: US 6,495,977 B2
(45) Date of Patent: Dec. 17, 2002

(54) VERTICAL DEFLECTION CIRCUIT, PROCESSOR FOR VERTICAL DEFLECTION, AND CRT DISPLAY

(75) Inventor: Makoto Kumano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/919,822

(22) Filed: Aug. 2, 2001

(65) Prior Publication Data

US 2002/0047664 A1 Apr. 25, 2002

(30) Foreign Application Priority Data

Sep. 29, 2000 (JP) .......................................... 2000-298353

(51) Int. Cl.$^7$ ................................................ H01J 29/56
(52) U.S. Cl. ........................................ 315/370; 315/371
(58) Field of Search ................................. 315/371, 370, 315/387, 411

(56) References Cited

U.S. PATENT DOCUMENTS 4,737,691 A * 4/1988 den Hollander et al. .... 315/371

FOREIGN PATENT DOCUMENTS

JP          06113164          4/1994

* cited by examiner

*Primary Examiner*—David Vu
(74) *Attorney, Agent, or Firm*—Birch, Stewart, Kolasch & Birch, LLP

(57) ABSTRACT

There is disclosed a vertical deflection circuit for use in a display device employing a CRT. The vertical deflection circuit has a DSP (digital signal processor) for producing a digital current signal during each main period. This digital current signal shows plural current values which increases in first equal increments from a different value during each main period. The digital current value is converted into an analog current signal by a D/A converter and then averaged by a low-pass filter. A vertical deflection current is produced based on the averaged analog current signal. Because plural different current values are averaged, the average value varies linearly. Accordingly, the vertical deflection current varies linearly with each main period.

15 Claims, 17 Drawing Sheets

FIG.6

| INPUT VALUE TO DAC (DIGITAL CURRENT VALUE) | OUTPUT VALUE FROM DAC (ANALOG CURRENT VALUE) | OUTPUT 1 FROM LPF (AVERAGE OF 8 POINTS) | OUTPUT 2 FROM LPF (AVERAGE OF 16 POINTS) |
|---|---|---|---|
| 0 | 0 | 3.500 | 9.25 |
| 1 | 1 | 4.500 | 10.75 |
| 2 | 2 | 5.625 | 12.25 |
| 3 | 3 | 6.875 | 13.75 |
| 4 | 4 | 8.250 | 15.25 |
| 5 | 5 | 9.750 | 16.75 |
| 6 | 6 | 11.375 | 18.25 |
| 7 | 7 | 13.125 | 19.75 |
| 8 | 8 | 15.000 | 21.25 |
| 9 | 10 | 17.000 | 22.75 |
| 10 | 12 | 18.875 | 24.25 |
| 11 | 14 | 20.625 | 25.75 |
| 12 | 16 | 22.250 | 27.25 |
| 13 | 18 | 23.750 | 28.75 |
| 14 | 20 | 25.125 | 30.25 |
| 15 | 22 | 26.375 | 31.75 |
| 16 | 24 | 27.500 | 33.25 |
| 17 | 25 | 28.500 | 34.75 |
| 18 | 26 | 29.625 | 36.25 |
| 19 | 27 | 30.875 | 37.75 |
| 20 | 28 | 32.250 | 39.25 |
| 21 | 29 | 33.750 | 40.75 |
| 22 | 30 | 35.375 | 42.25 |
| 23 | 31 | 37.125 | 43.75 |
| 24 | 32 | 39.000 | 45.25 |
| 25 | 34 | 41.000 | 46.75 |
| 26 | 36 | 42.875 | 48.25 |
| 27 | 38 | 44.625 | 49.75 |
| 28 | 40 | 46.250 | 51.25 |
| 29 | 42 | 47.750 | 52.75 |
| 30 | 44 | 49.125 | 54.25 |

| ROW \ COLUMN | 1 | 2 | 3 | 4 | 5 | 6 | 7 | 8 |
|---|---|---|---|---|---|---|---|---|
| 1 | 1 | 2 | 3 | 4 | 5 | 6 | 7 | 8 |
| 2 | 17 | 18 | 19 | 20 | 21 | 22 | 23 | 24 |
| 3 | 33 | 34 | 35 | 36 | 37 | 38 | 39 | 40 |
| 4 | 9 | 10 | 11 | 12 | 13 | 14 | 15 | 16 |
| 5 | 25 | 26 | 27 | 28 | 29 | 30 | 31 | 32 |

(b)

| ROW \ COLUMN | 1 | 2 | 3 | 4 | 5 | 6 | 7 | 8 |
|---|---|---|---|---|---|---|---|---|
| 1 | 1 | 2 | 3 | 4 | 5 | 6 | 7 | 8 |
| 2 | 16 | 15 | 14 | 13 | 12 | 11 | 10 | 9 |
| 3 | 17 | 18 | 19 | 20 | 21 | 22 | 23 | 24 |
| 4 | 32 | 31 | 30 | 29 | 28 | 27 | 26 | 25 |
| 5 | 33 | 34 | 35 | 36 | 37 | 38 | 39 | 40 |

FIG.17

| 42 | 21 | 22 | 23 | 24 | 25 | 26 |
|---|---|---|---|---|---|---|
| 41 | 20 | 7 | 8 | 9 | 10 | 27 |
| 40 | 19 | 6 | 1 | 2 | 11 | 28 |
| 39 | 18 | 5 | 4 | 3 | 12 | 29 |
| 38 | 17 | 16 | 15 | 14 | 13 | 30 |
| 37 | 36 | 35 | 34 | 33 | 32 | 31 |

VERTICAL DEFLECTION CIRCUIT, PROCESSOR FOR VERTICAL DEFLECTION, AND CRT DISPLAY

BACKGROUND OF THE INVENTION

1. Field of the Invention

This invention relates to a vertical deflection circuit used in a display device employing a cathode-ray tube (CRT) that displays an image by scanning an electron beam. The invention also relates to a processor used in this vertical deflection circuit and to a CRT display using the aforementioned vertical deflection circuit.

2. Background Art

CRTs having electron guns that emit an electron beam scanned vertically and horizontally in two dimensions to display an image on a viewing screen have been heretofore known. In this kind of CRT display, an electron beam is deflected in two dimensions by magnetic forces. Thus, substantially horizontal scanning lines are drawn in turn from the top end of the viewing screen toward the bottom end. In this way, the CRT accomplishes a display of an image.

The magnetic forces for deflecting the electron beam are normally offered from vertical and horizontal deflection coils. These coils are mounted in the path of the electron beam. Electric currents are supplied to the coils from vertical and horizontal deflection circuits. Owing to the supply of the currents, the coils can generate magnetic fields necessary to deflect the electron beam vertically and horizontally.

FIG. 18 is a diagram illustrating an electric current (hereinafter referred to as the "vertical deflection current") supplied from the vertical deflection circuit to the vertical deflection coils. In FIG. 18, the horizontal axis indicates time, while the vertical axis indicates the value of the vertical deflection current. Point A indicates the value of the vertical deflection current at the top end of the viewing screen. Point B denotes the value of the vertical deflection current at the bottom end of the viewing screen.

As mentioned previously, the scanning lines are successively drawn from the top end toward the bottom end of the viewing screen. Therefore, the vertical deflection current supplied to the vertical deflection coils is so set as to vary linearly from the top end of the viewing screen toward the bottom end to vary the vertical deflection angle of the electron beam in substantially uniform angular increments. To return the electron beam to the top end of the viewing screen after reaching the bottom end of the viewing screen, the vertical deflection current is so set as to return to its original value during a short retrace period and again start to vary linearly.

Some of vertical deflection circuits for generating such vertical deflection currents produce vertical deflection currents digitally. This kind of vertical deflection circuit normally generates a digital current signal by a digital value-generating portion corresponding to some functions of a digital signal processor (DSP). A vertical deflection current corresponding to the generated digital current signal is produced. The digital current signal is generated during each main period in which the vertical deflection angle of the electron beam is varied, and has one digital current value.

The vertical deflection circuit is described in further detail. This vertical deflection circuit includes a D/A (digital-to-analog) converter, a low-pass filter (LPF), and a driver circuit, in addition to the digital signal value-generating portion described above. The D/A converter converts a digital current signal into an analog current signal. In this case, the analog current signal has an analog current value that shows a 1:1 correspondence to one digital current value forming the digital current signal. The analog current signal is supplied to the driver circuit via the LPF. The driver circuit supplies a current corresponding to the aforementioned analog current value as a vertical deflection current to the vertical deflection coils.

However, this vertical deflection circuit has the disadvantage that it may not be able to convert the digital current signal into an analog current signal of a desired amplitude due to distortion in the linearity of the input/output characteristics of the D/A converter. In this case, the angular increment of the deflection angle of the electron beam varies from location to location. As a result, spacing between the scanning lines becomes nonuniform, giving rise to fringes of varying shade on the viewing screen.

More specifically, the vertical deflection circuit is intended to vary the vertical deflection current linearly over the whole period for displaying a frame of image. That is, the vertical deflection circuit linearly varies the deflection angle of the electron beam to draw scanning lines at regular intervals, thus displaying an image at a uniform density.

However, where the linearity of the input/output characteristics of the D/A converter has distortion, the vertical deflection current varies in unequal increments. As a result, the vertical deflection angle of the electron beam varies in unequal angular increments In particular, the input/output characteristics of the D/A converter are normally distorted as indicated by the solid line in FIG. 19(a) from ideal characteristics indicated by the broken line. That is, even if the digital current signal is varied in uniform increments, the analog current signal produced from the D/A converter varies in nonuniform increments.

In this case, in locations where the analog current signal varies in larger increments, the deflection angle of the electron beam varies in greater increments, resulting in lower scanning line densities.Consequently, the viewing screen becomes darker.

On the other hand, in locations where the analog current is varied in smaller increments, the deflection angle of the electron beam varies in smaller increments, resulting in higher scanning line densities. The result is that the viewing screen becomes brighter. Hence, the viewing screen contains both locations 50 where the scanning lines density is lower and hence are darker and locations 60 where the density is higher and hence are brighter as shown in FIG. 19(b). This produces a fringe pattern.

SUMMARY OF THE INVENTION

Accordingly, it is an object of the present invention to provide a vertical scanning circuit that solves the foregoing technical problems and is capable of producing a vertical scanning current which varies linearly if the linearity of the input/output characteristics of the D/A converter has distortion.

It is another object of the invention to provide a processor used in the vertical deflection circuit described above.

It is a further object of the invention to provide a CRT display that uses the above-described vertical deflection circuit to thereby make uniform the scanning line density.

This invention is intended to achieve the aforementioned objects and pertains to a vertical deflection circuit for generating a vertical deflection current supplied to vertical deflection coils that generate a magnetic field necessary to deflect an electron beam vertically. That is, a vertical deflection circuit in accordance with this invention comprises a digital signal value-generating portion for producing a digital current signal, a D/A converter for converting the digital current signal produced by this digital value-generating circuit into an analog current signal, a filter for extracting the average value of the analog current signal produced from the D/A converter, and a driver circuit for supplying a vertical deflection current corresponding to the average value of the analog current signal extracted by the filter to the vertical deflection coils described above. This digital value-generating portion produces a digital current signal that shows plural different digtal values during a predetermined each main period which a vertical deflection angle of the electron beam is varied. The digital current values determine vertical deflection current values.

In this structure, the digital current signal showing plural different digital current values during each main period is produced. The average value of the analog current signal corresponding to the digital current signal is taken as the reference for the vertical deflection current. Accordingly, if the linearity of the input/output characteristics of the D/A converter has distortion, the vertical deflection current can be varied in substantially uniform increments. Therefore, the vertical deflection angle of the electron beam can be varied in substantially uniform angular increments. This prevents the scanning line density from becoming nonuniform. In consequence, a high-quality image can be produced on the viewing screen.

The above-described digital value-generating portion can be one function of a processor used in a vertical deflection circuit that supplies a vertical deflection current to vertical deflection coils after the average value of the analog current signal converted from the digital current signal by the D/A converter is extracted by a filter, the vertical deflection current corresponding to the average value. That is, this processor has a digital value-generating means that generates a digital current signal having plural different digital current values defining vertical deflection current values during a predetermined each main period in which the vertical deflection angle of the electron beam is varied and delivers this digital current signal.

In this structure, the digital current signal is generated in software and so it is easy to cope with the situation whatever input/output characteristics does the D/A converter have, the D/A converter being used as a part of the vertical deflection circuit. Therefore, excellent generality can be given to the vertical deflection circuit.

The present inventors have found that the method of selection of cells forming the D/A converter is one cause of generation of distortion in the linearity of the input/output characteristics of the D/A converter.

In particular, in the prior art D/A converter, where plural cells are selected, they may be spaced from each other. Cells located close to each other show similar characteristics. However, cells remotely spaced from each other exhibit different characteristics. In this way, cells normally are not uniform in characteristics. Accordingly, if cells remote from each other are selected, the linearity of the input/output characteristics of the D/A converter is distorted.

Accordingly, it is conceivable that this invention for achieving the aforementioned objects makes use of a D/A converter including plural cells arranged in two dimensions and turned on and off and a cell-selecting means for selecting only adjacent cells when a necessary number of cells are turned on based on the digital current value contained in the digital current signal.

In this structure, only mutually adjacent cells are selected and so distortion in the characteristics can be suppressed unlike in the prior art technique in which cells physically remotely spaced from each other have produced distortion in the characteristics. Therefore, the input/output characteristics of the D/A converter can be stabilized. Consequently, the vertical deflection current can be varied in substantially uniform increments. This assures that the vertical deflection angle of the electron beam is varied in substantially uniform angular increments. This prevents the scanning line density from becoming nonuniform. Hence, a high-quality image can be produced on the viewing screen.

In addition, the aforementioned vertical deflection circuit can be used in a CRT display. In particular, this CRT display comprises an electron gun for emitting an electron beam, vertical deflection coils for producing a vertical magnetic field necessary to deflect the electron beam vertically, the aforementioned vertical deflection circuit for producing a vertical deflection current necessary to produce the vertical magnetic field required to deflect the electron beam vertically, horizontal deflection coils for producing a horizontal magnetic field necessary to deflect the electron beam horizontally, and a display portion on which scanning lines are drawn by the electron beam whose direction of travel is deflected in two dimensions by the magnetic fields produced by the vertical deflection coils and the horizontal vertical deflection coils.

In this structure, the scanning line density can be made uniform. Consequently, a high-quality image can be produced on the viewing screen.

BRIEF DESCRIPTION OF THE DRAWINGS

FIG. 6 is a table illustrating examples of numerical values indicating the input/output characteristics of the D/A converter and the output from the LPF;

FIG. 16 is a conceptual diagram illustrating processing for selecting cells in accordance with a fourth embodiment of the invention;

FIG. 17 is a conceptual diagram illustrating a modification of the fourth embodiment;

DETAILED DESCRIPTION OF THE PREFERRED EMBODIMENTS

The preferred embodiments of this invention are hereinafter described in detail by referring to the accompanying drawings.

First Embodiment

Figure 1:
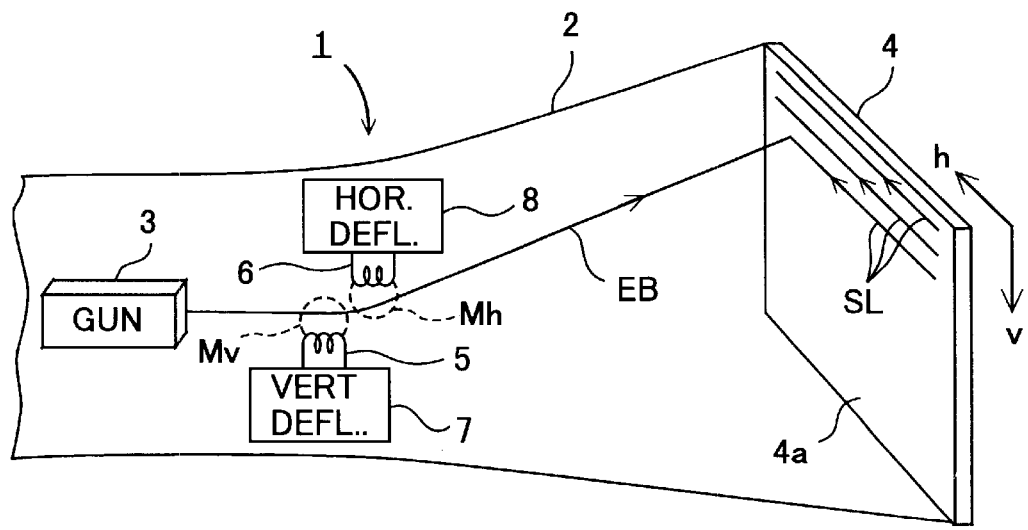
FIG. 1 is a conceptual diagram showing the internal structure of a CRT display in accordance with a first embodiment of the invention.

FIG. 1 is a conceptual diagram showing the structure of a CRT display using a vertical deflection circuit in accordance with a first embodiment of this invention. This CRT display, indicated by numeral 1, has an electron gun 3 incorporated in a CRT 2. The electron gun 3 emits an electron beam EB that scans the inner surface 4a of a viewing screen 4 in two dimensions, thus displaying an image. More specifically, in this CRT display 1, the electron beam EB is deflected in a vertical direction v and in a horizontal direction h by magnetic forces along successive lines. Thus, substantially horizontal scanning lines SL are successively drawn from the top end toward the bottom end of the faceplate. In this manner, phosphors applied to the inner surface 4a of the viewing screen 4 are selectively excited into emission, thus displaying an image.

More specifically, this CRT display 1 has vertical deflection coils 5 and horizontal deflection coils 6 in the path of the electron beam EB. The vertical deflection coils 5 produce a magnetic field Mv for deflecting the electron beam EB in the vertical direction v. The horizontal deflection coils 6 produce a magnetic field Mh for deflecting the electron beam EB in the horizontal direction h.

A vertical deflection circuit 7 is electrically connected with the vertical deflection coils 5. The vertical deflection circuit 7 supplies a vertical deflection current to the vertical deflection coils 5, the vertical deflection current being necessary to produce a magnetic field. A horizontal deflection circuit 8 is electrically connected with the horizontal deflection coils 6 to supply a horizontal deflection current to the horizontal deflection coils 6, the horizontal deflection current being necessary to produce a magnetic field.

Figure 2:
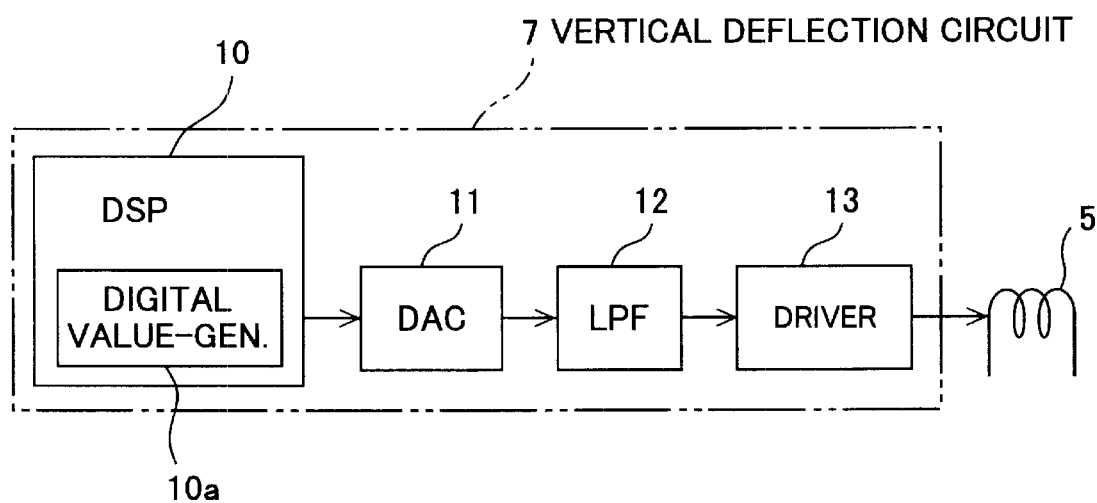
FIG. 2 is a block diagram of a vertical deflection circuit incorporated in a CRT display.

FIG. 2 is a block diagram showing the structure of the vertical deflection circuit 7, which generates the vertical deflection current digitally. In particular, this vertical deflection circuit 7 includes a DSP (digital signal processor) 10, a D/A converter (DAC) 11, a LPF (low-pass filter) 12, and a driver circuit 13. The DSP 10 has a function of generating a digital current signal indicating the vertical deflection current and sending it out. In FIG. 2, this function is represented as a digital value-generating portion 10a.

The D/A converter 11 receives the digital current signal delivered from the DSP 10 and converts the digital current signal into an analog current signal. The LPF 12 extracts the average value of the analog current signal delivered from the D/A converter 11. The driver circuit 13 creates an electric current corresponding to the average value of the analog current signal extracted by the LPF 12, and supplies this current as a vertical deflection current to the vertical deflection coils 5.

This vertical deflection circuit 7 supplies the vertical deflection current to the vertical deflection coils 5 to vary the vertical deflection angle of the electron beam EB in uniform increments even if the linearity of the input/output characteristics of the D/A converter 11 has distortion. In particular, this vertical deflection circuit 7 sets the vertical deflection current to a desired value during each main period Tm, or a unit period, by setting the digital current signal generated by the digital value-generating portion 10a to a certain pattern during each main period Tm and by passing the analog current signal corresponding to the digital current signal through the LPF 12.

In other words, this vertical deflection circuit 7 generates a digital current signal having digital current values whose magnitudes and number enable production of an analog current signal varying linearly whenever each main period Tm elapses if averaging is done within the main period Tm. The digital current value digitally stipulates the vertical deflection current value. This vertical deflection circuit 7 passes the analog current signal corresponding to the digital current signal through the LPF 12, thus absorbing the distortion in the input/output characteristics of the D/A converter 11. Since the desired vertical deflection current can be generated in this way, the electron beam EB can be deflected through the desired vertical deflection angle. Hence, the scanning line density can be made uniform.

The structure of the vertical deflection circuit 7 is described in further detail. The DSP 10 realizes various functions executed by this CRT display 1 in software. The vertical deflection circuit 7 includes, as one component, the digital value-generating portion 10a corresponding to the digital current-generating function that is one of the various functions described above. The digital value-generating portion 10a has a function of digitally indicating the vertical deflection current value to be supplied to the vertical deflection coils 5. The digital value-generating portion 10a creates the digital current signal in software and sends out this digital current signal from given output pins.

Figure 3:
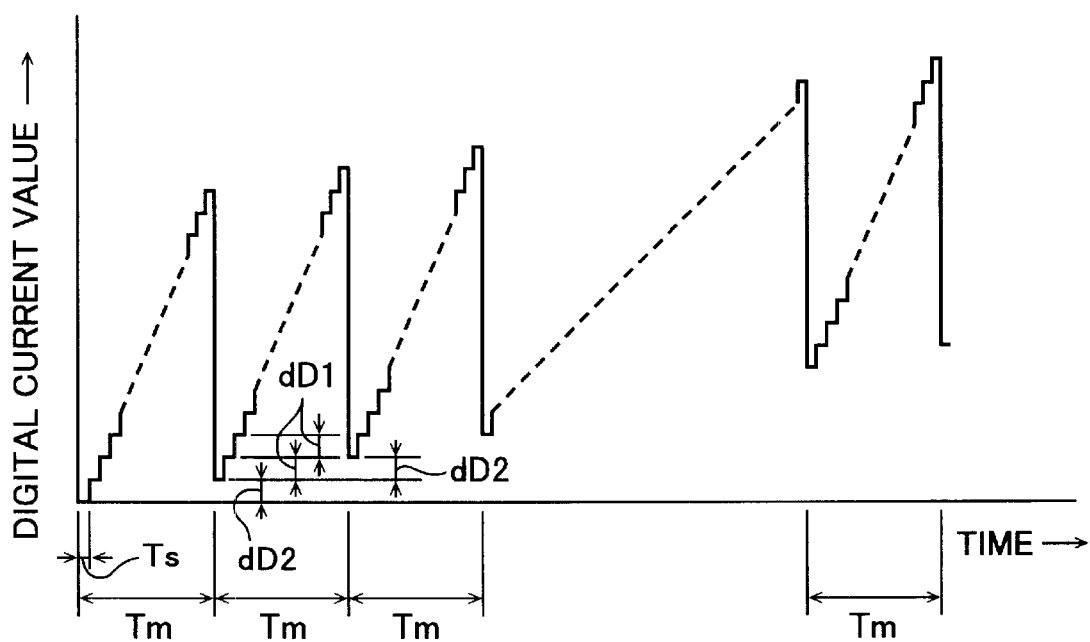
FIG. 3 is a diagram illustrating the configuration of a digital current signal.

FIG. 3 is a diagram showing the configuration of the digital current signal. In FIG. 3, the horizontal axis indicates time, while the vertical axis denotes the digital current value. The digital value-generating portion 10a generates and delivers the digital current signal during each main period Tm. The main period Tm is the output interval of the digital current signal. For example, this corresponds to the time taken for the electron beam EB to scan from end to end in the horizontal direction h. That is, the main period Tm represents the time taken to draw one scanning line. The digital current signal is created and delivered during every main period Tm established while one frame of image is being formed.

The digital current signal has plural different current values during each sub-periods Ts. Each sub-period Ts corresponds to a time that is 1/n (n is an integer equal to or greater than 2) of the main period Tm. The digital current value is represented by 8-bit sequence, for example. The number of bits can be set at will according to the processing speed of the vertical deflection circuit 7. Furthermore, the digital current value is represented in hexadecimal notation. Accordingly, in the case of 8 bits, the digital current value represents "00" to "ff". In the description below, the case in which the value varies from "00" to "01" is stated that the digital current value has changed by 1.

The digital current signal has plural digital current values that vary in a given pattern with each sub-period Ts. This certain pattern can absorb the distortion in the linearity of the input/output characteristics of the D/A converter 11 if the pattern is averaged over one main period Tm. Specifically, the digital current signal shows plural digital current values that varies in equal increments in a given direction of change within each main period Tm from the different value during each main period.

More specifically, the digital current value of the digital current signal assumed during the first sub-period Ts of one main period Tm is different from values assumed during the first sub-periods Ts of the other main periods Tm. The digital current value varies from this first value in given first increments dD1 (equal increment as in the Claims) in the same direction of change. At this time, the direction of change is such that the value increases, for example. The first increment dD1 is 1, for example. In this case, the first digital current value of each digital current signal assumed during each main period Tm varies in second increments dD2 in the given direction whenever each main period Tm elapses. At this time, the direction of change is such that the value increases. The second increment dD2 is 1, for example.

In this way, the digital value-generating portion 10a of the DSP 10 creates and delivers a digital current signal having plural different current values during each sub-periods Ts. The digital current signal delivered from the DSP 10 is applied to the D/A converter 11 as mentioned previously.

Referring back to FIG. 2, the D/A converter 11 converts the digital current signal supplied from the DSP 10 into an analog current signal. Note that the digital current signal does not show one digital current value but has n different digital current values as mentioned previously. Accordingly, where the digital current signal is fed to the D/A converter 11 during one main period Tm, it follows that the D/A converter 11 obtains n analog current values corresponding to the n digital current values. In this case, of course, the analog current value corresponds to the input/output characteristics of the D/A converter 11. The D/A converter 11 supplies the analog current signal composed of n analog current values to the LPF 12.

The LPF 12 suppresses the RF components of the analog current signal and passes only low-frequency components. In other words, the LPF 12 extracts the average value of the analog current signal. As mentioned above, the analog current signal has analog current values corresponding to n digital current values. Accordingly, the LPF 12 extracts the average value of the n analog current values over one main period Tm. The average value delivered from the LPF 12 is supplied to the driver circuit 13, which in turn generates an electric current corresponding to the average value and supplies this current as a vertical deflection current to the vertical deflection coils 5.

The digital current value forming the digital current signal can be set at will. However, it is desired to set the digital current value to be created during one main period Tm according to the input/output characteristics of the D/A converter 11 as follows.

Figure 4:
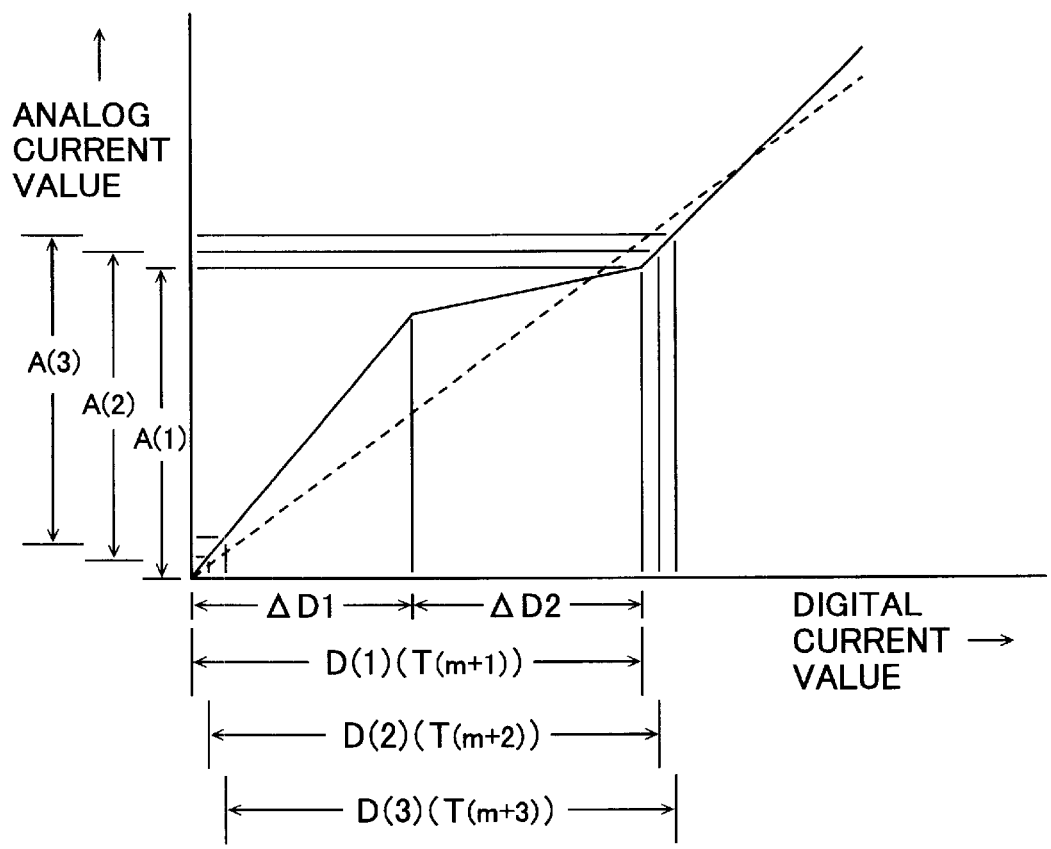
FIG. 4 is a diagram illustrating the input/output characteristics of a D/A converter.

FIG. 4 is a diagram illustrating the input/output characteristics of the D/A converter 11. In FIG. 4, the horizontal axis indicates the digital current values contained in the digital current signal, whereas the vertical axis indicates the analog current value contained in the analog current signal that is the output. Normally, the input/output characteristics of such a D/A converter 11 are known. In other words, it is previously known how the input/output characteristics of the D/A converter 11 are distorted. Accordingly, in view of the distortion in the input/output characteristics of the D/A converter 11, the digital current values contained in the different output characteristics of the D/A converter 11 are set as digital current values to be generated during one main period Tm.

More specifically, a first range ΔD1 in which the gradient is steeper than the ideal characteristics indicated by the broken line and a second range ΔD2 in which the gradient is milder appear alternately and periodically in the input/output characteristics of the D/A converter 11. In this case, the first range ΔD1 and the second range ΔD2 appear at almost regular intervals. Accordingly, in this first embodiment, plural digital current values contained in the two ranges ΔD1 and ΔD2 in which the output characteristics are different are generated during one main period Tm. For example, where the first range ΔD1 corresponds to a range of digital current values from 1 to 16 and the second range ΔD2 corresponds to a range of digital current values from 7 to 32, all digital current values contained in these first and second ranges ΔD1 and ΔD2 are set as digital current values to be created during the main period Tm.

Where the digital current value is set in this way, the analog current signal delivered from the D/A converter (DAC) 11 becomes as follows. Digital current signal D(1) applied during the first main period T(m+1) is delivered as an analog current signal A(1). Digital current signal D(2) applied during the second main period T(m+2) next to the first main period T(m+1) starts from a value greater than the digital current signal D(1) by second increment dD2 and ends with this value greater by the second increment dD2. Accordingly, the digital current value D(2) is delivered as an analog current signal A(2) that is shifted with respect to the analog current signal A(1) by the second increment dD2 in the increasing direction.

A digital current signal D(3) applied during the third main period T(m+3) next to the second main period T(m+2) starts with a value greater than the digital current signal D(2) supplied during the second main period T(m+2) by the second increment dD2 and ends with this value greater by the second increment dD2. Accordingly, the digital current value D(3) is delivered as an analog current signal A(3) shifted with respect to the analog current signal A(2) by the second increment dD2 in the increasing direction.

Figure 5:
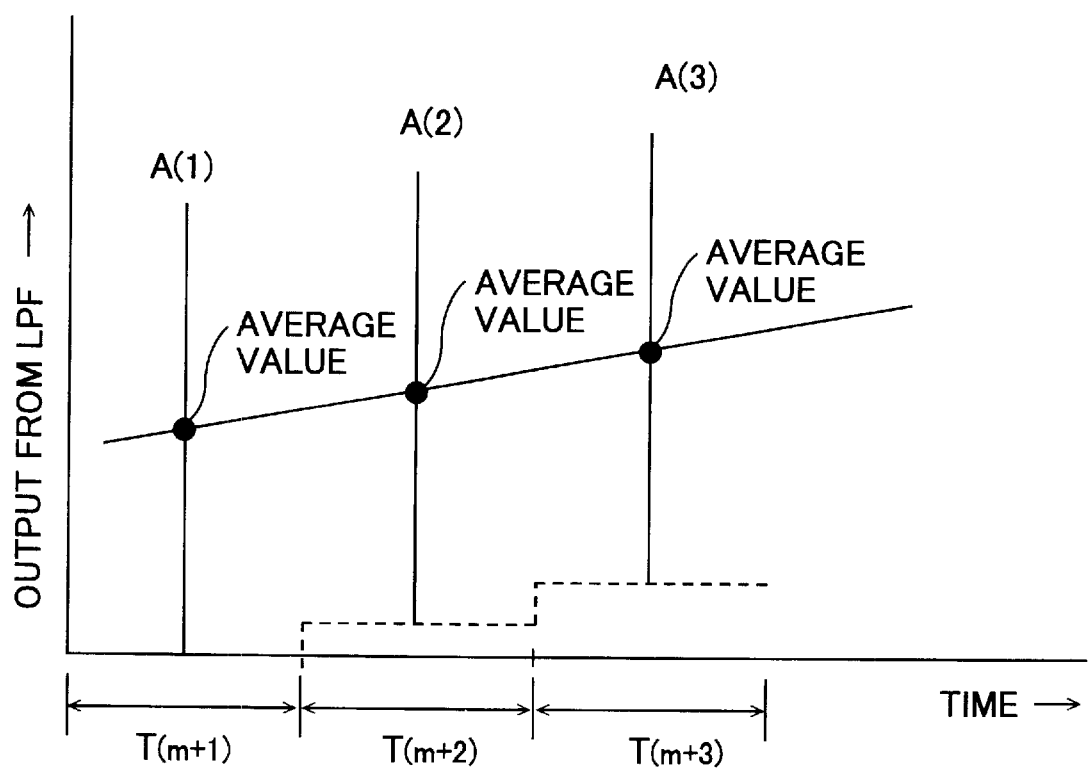
FIG. 5 is a diagram illustrating the output from an LPF (low-pass filter)

FIG. 5 is a diagram illustrating the output from the LPF (low-pass filter) 12. In FIG. 5, the horizontal axis indicates time, while the vertical axis indicates the output from the LPF 12. Whenever each of main periods T(m+1), T(m+2), T(m+3), and so forth elapses, the analog current signal such as A(1), A(2), A(3), and so on delivered from the D/A converter 11 is shifted by the second increment dD2 in the increasing direction. Therefore, if the analog current signal A(1), A(2), A(3), and so on is passed through the LPF 12, an average value is obtained that increases in uniform increments with the elapse of main period Tm as indicated by the black circles in FIG. 5. That is, the output from the LPF 12 increases linearly.

If digital current values derived from ranges representing mutually opposite characteristics are produced during one main period Tm, and if this output is averaged by the LPF 12, the average value changes linearly. It follows that the driver circuit 13 supplies the vertical deflection current varying in uniform increments to the vertical deflection coils 5. In consequence, the vertical deflection current that varies by a uniform amount with the elapse of each main period Tm flows into the vertical deflection coils 5.

As a result, the electron beam EB is deflected with uniform angular increments from the top end of the viewing screen toward the bottom end. In this way, scanning lines are drawn at a uniform density. Hence, the scanning line density is uniform over the whole viewing screen. This suppresses generation of fringes of varying shade. Consequently, a high-quality image can be produced on the viewing screen.

Figure 7:
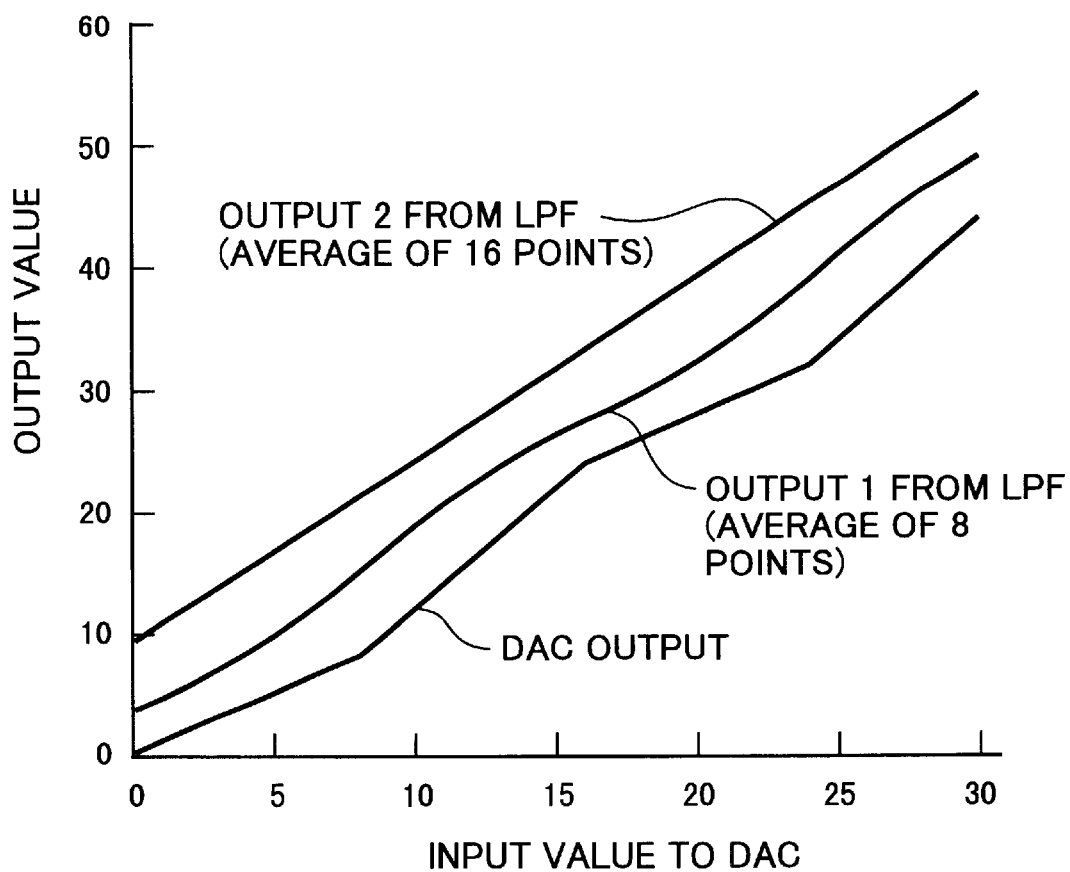
FIG. 7 is a graph showing the input/output characteristics of the D/A converter of the numerical example shown in FIG. 6 and the output from the LPF.

FIG. 6 is a diagram illustrating examples of numerical values of the input/output characteristics of the D/A converter and numerical values of the LPF. FIG. 7 is a graph showing the input/output characteristics of the D/A converter in the examples of numerical values and the output characteristics of the LPF.

In this example, if the digital current value that is an input value to the D/A converter 11 is 0, the analog current value that is the output value from the D/A converter 11 is 0. If the digital current value increments to 1–8 in turn, the analog current value increments to 1–8 in turn. If the digital current value increments to 9–16 in turn, the analog current value increases by 2 at a time and varies from 10 to 32. If the digital current value increments and varies from 17 to 24, the analog current value increments and varies from 25 to 32. In this way, the input/output characteristics of the D/A converter 11 are such that intervals in which the gradient is milder alternate at regular intervals with intervals in which the gradient is steeper, as shown in FIG. 7. In this way, the characteristics fluctuate.

In this case, it is assumed that the number n of digital current values within one main period Tm is 8 and that the first increment dD1 and the second increment dD2 are both 1. The output from the LPF 12 assumes the form "output 1 from LPF" as shown in FIGS. 6 and 7. That is, in this case, the output from the LPF 12 fluctuates slightly periodically but varies more linearly than the output from the D/A converter 11.

Where the number of digital current values n is set to 16 and the first increment dD1 and the second increment dD2 are set to 1, the output from the LPF 12 takes the form "output 2 from the LPF" as shown in FIGS. 6 and 7. That is, in this case, the output from the LPF 12 varies more linearly than the "output 1 from the LPF".

Where plural digital values are delivered within one main period Tm in this way, if the input/output characteristics of the D/A converter 11 has distortion, the analog current value can be varied linearly from the LPF 12. Therefore, the vertical deflection current can be varied in relatively uniform increments. Hence, the scanning line density can be made uniform.

As can be seen from FIG. 7, the linearity can be improved in both cases in which n=8 and n=16, respectively. In the case in which n=16, the linearity can be improved more greatly than in the case in which n=8. In other words, the linearity can be improved better by increasing the number n. That is to say, the linearity of the vertical deflection current can be improved greatly where two kinds of intervals of the input/output characteristics of the D/A converter 11 in which the gradient is milder and steeper, respectively, are both subjected to averaging. Even if n=8, i.e., only those intervals of the input/output characteristics of the D/A converter 11 which have the same output characteristics are subjected to averaging, the linearity can be improved, as can be seen from FIG. 7.

Figure 8:
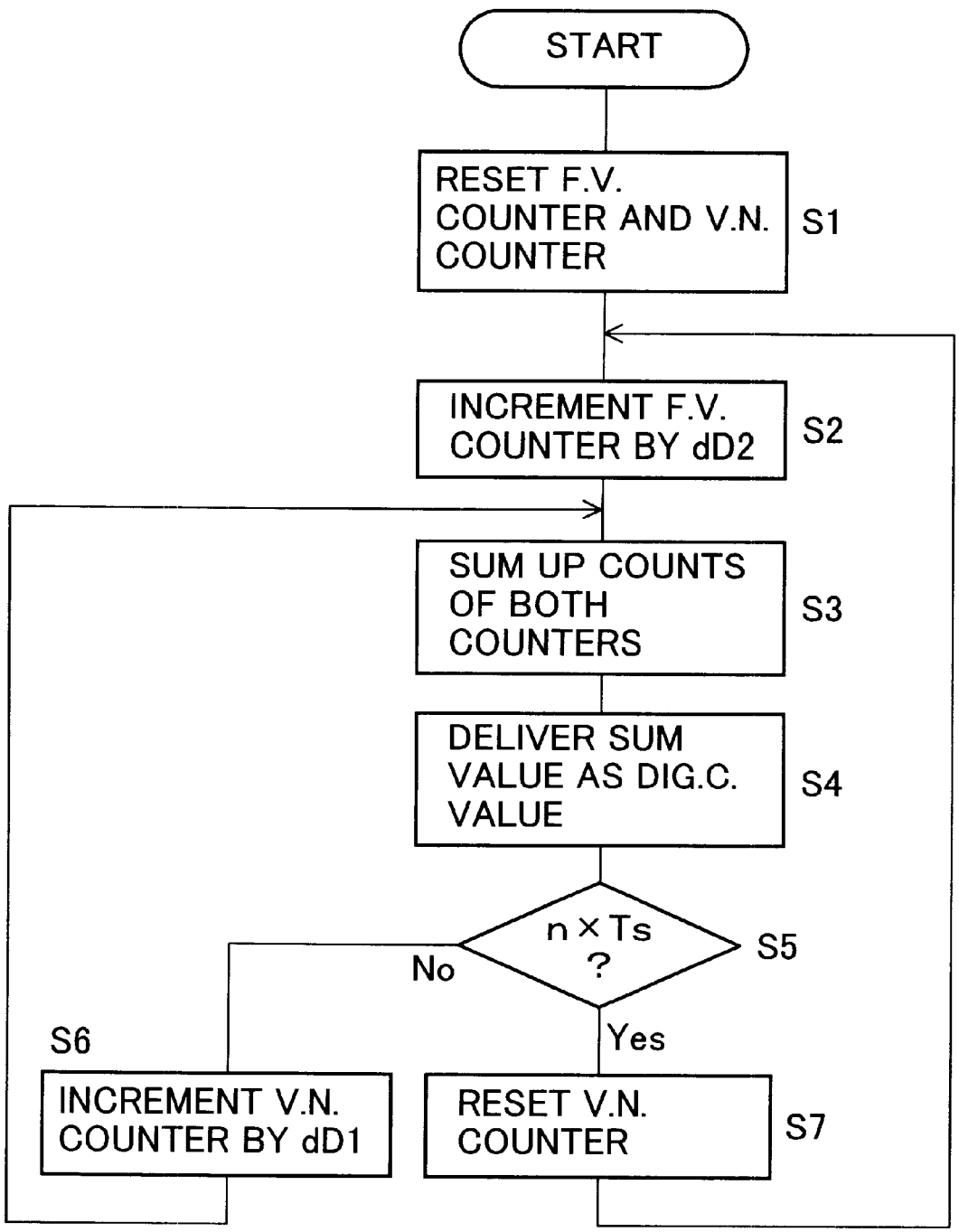
FIG. 8 is a flowchart illustrating processing for creating a digital current signal.

FIG. 8 is a flowchart illustrating processing for creating a digital current signal in the digital value-generating portion 10a of the DSP 10. As mentioned above, the plural digital current signals have their respective fiducial values which increase by the second increment dD2 whenever each main period Tm elapses. Furthermore, each digital current signals have digital current values that increase from their respective fiducial values by the first increment dD1 whenever each sub-period Ts passes. The digital value-generating portion 10a has two counters realized by software to accomplish this pattern. The counters consist of a fiducial value counter and a variable number counter. By causing these counters to count, the aforementioned digital current signals are generated.

The digital value-generating portion 10a resets the fiducial value counter and the variable number counter at the timing of start of each main period Tm (step S1). The fiducial value counter is incremented by the second increment dD2 (step S2). The digital value-generating portion 10a sums up the count of the fiducial value counter and the count of the variable number counter (step S3). The resulting value is delivered as a digital current value (step S4). Owing to the processing described thus far, the same digital current value as the fiducial value is delivered first.

Then, the digital value-generating portion 10a makes a decision as to whether the sub-period Ts is repeated a predetermined number n (step S5). If the repetition number n of the sub-period Ts is not yet reached, the digital value-generating portion 10a increments the variable number counter by the first increment dD1 (step S6). Subsequently, the digital value-generating portion 10a goes to the step S3, where the count of the fiducial value counter and the count of the variable number counter are summed up, and the resulting sum value is delivered as a digital current value. In this case, the digital current value greater than the fiducial value by the first increment dD1 is delivered.

Thereafter, the digital value-generating portion 10a repeatedly carries out the processing described thus far. As a result, the digital value-generating portion 10a produces successively a digital current value that increases by the first increment dD1 with each sub-period Ts. If the result of the decision made in step S5 is that the number of repetition n of the sub-period Ts has reached a given number, it follows that one main period Tm has ended. The digital value-generating portion 10a resets a modulation counter (step S7) and goes to the step S2, in which the fiducial value counter is incremented by the second increment dD2. Subsequently, the digital value-generating portion 10a repeatedly carries out the processing starting with the step S3. As a result, the digital value-generating portion 10a produces the digital current value that increases from the fiducial value by increments of the first increment dD1, the fiducial value being greater than the value assumed during the previous main period Tm by the second increment dD2.

As described thus far, in this first embodiment, the digital current signal having plural digital current values that vary in a given pattern with each sub-period Ts is created during each main period Tm. This digital current signal is converted into an analog current signal and then passed through the LPF 12. Accordingly, an analog current signal that is averaged over each main period Tm can be obtained.

Therefore, the vertical deflection current supplied to the vertical deflection coils 5 can be varied in uniform increments. Consequently, the vertical deflection angle of the electron beam EB can be varied in uniform angular increments. For this reason, the scanning line density can be made uniform over the whole viewing screen. Hence, a high-quality image can be produced on the viewing screen.

Furthermore, if at least plural digital current values contained in the different output characteristics of the D/A converter 11 are treated as digital current values to be generated during each main period Tm, the linearity of the output from the LPF 12 can be enhanced further. This can be accomplished by increasing the number of the digital current values n within each main period Tm, for example. In this case, the uniformity of the scanning line density can be improved further. In consequence, a higher-quality image can be realized on the viewing screen.

Moreover, the digital current signal is generated in software by the DSP 10. Therefore, even if whatever input/output characteristics do the D/A converter 11 have, it is easy to cope with the input/output characteristics of the D/A converter 11 used as a part of the vertical deflection circuit 7. That is, it is easy to cope with the input/output characteristics of the D/A converter 11, irrespective of the input/output characteristics of the D/A converter 11, simply by rewriting the computer program. Therefore, excellent generality can be imparted to the vertical deflection circuit.

In addition, the digital current value can be simply varied monotonously within one main period Tm. Therefore, a counter of a simple structure can be used to generate digital current values in such a pattern. Accordingly, the structure of the digital value-generating portion 10a can be simplified.

Second Embodiment

Figure 9:
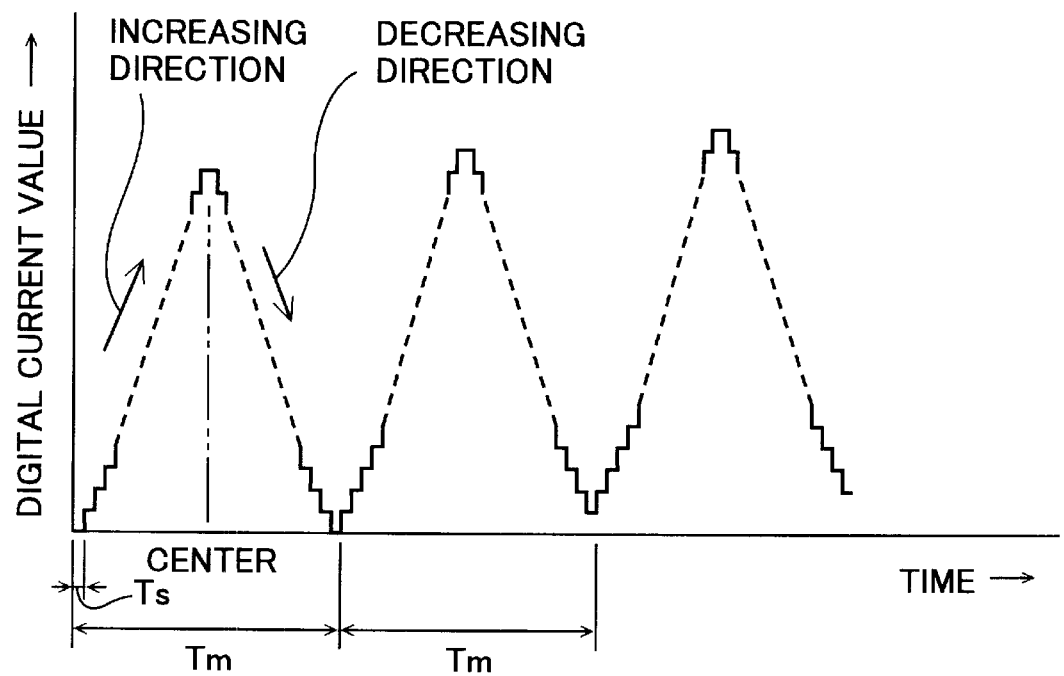
FIG. 9 is a diagram illustrating the configuration of a digital current signal in accordance with a second embodiment of the invention.

FIG. 9 is a diagram illustrating the structure of a digital current signal in accordance with a second embodiment of the present invention.

In the first embodiment described above, the digital current value is increased by the first increment dD1 with each sub-period Ts within one main period Tm. At the start of the next main period Tm, the value is returned to the fiducial value. The digital current value is varied in this pattern. That is, in the first embodiment, the digital current value is kept increased from the beginning of one main period Tm to the end of the period. Then, the value is reduced directly to the next fiducial value at the beginning of the next main period Tm. With this configuration, however, a great difference or step is produced when the value returns to the fiducial value at the beginning of the next main period Ts and so there is a possibility of generation of RF noise. Accordingly, in the second embodiment, the behavior pattern of the digital current value is so set as to suppress generation of RF noise.

More specifically, in this second embodiment, the digital current value does not keep increasing from the beginning of the main period Tm to its end. Rather, the value increases in the increasing direction to a midway point in the main period Tm and then decreases in the decreasing direction opposite to the increasing direction. In particular, this digital current value assumes its maximum value in the middle of the main period Tm and assumes its minimum value at the beginning and at the end of the main period Tm. That is, a triangular pattern is assumed. This is described in further detail. This digital current value assumes values as given by +1, +2, ..., +(n/2), +(n/2)−1, +(n/2)−2, ..., +1, from the beginning of the main period Tm toward its end.

Figure 10:
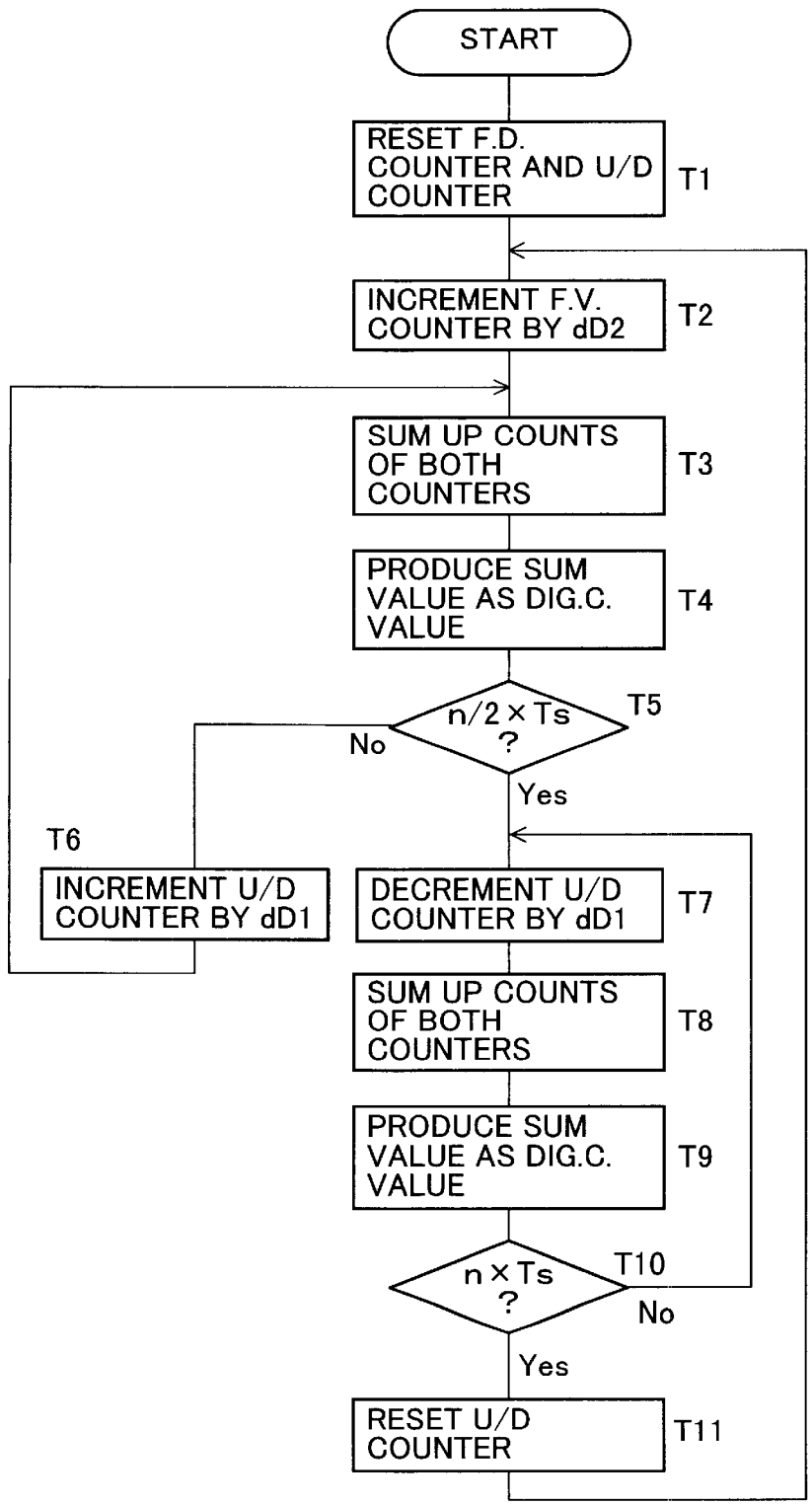
FIG. 10 is a flowchart illustrating the processing for creating the digital current signal in accordance with the second embodiment of the invention.

FIG. 10 is a flowchart illustrating processing for generating the digital current signal in the digital value-generating portion 10a of the DSP 10. The digital value-generating portion 10a is equipped with a fiducial value counter and an up/down counter that are realized in software to create the aforementioned triangular pattern of digital current values. These counters are made to count at given timing.

Specifically, the digital value-generating portion 10a responds at the starting timing of the main period Tm, resets the fiducial value counter and the up/down counter (step T1), and increments the fiducial value counter by the second increment dD2 (step T2). Then, the digital value-generating portion 10a sums up the count of the fiducial value counter and the count of the up/down counter (step T3). The resulting sum value is delivered as the digital current value (step T4).

Thereafter, the digital value-generating portion 10a makes a decision as to whether the center of the main period Tm is reached. That is, the digital value-generating portion 10a makes a decision as to whether the n/2th sub-period Ts has passed from the timing of start of the main period Tm (step T5). If the center of the main period Tm is not yet reached, the digital value-generating portion 10a increments the up/down counter by the first increment dD1 (step T6).

Then, the digital value-generating portion 10a sums up the count of the fiducial value counter and the count of the up/down counter (step T3). The resulting sum value is delivered as a digital current value (step T4). Therefore, a digital current value greater than the prior digital current value by the first increment dD1 is produced.

On the other hand, when the center of the main period Tm is reached, i.e., when the n/2th sub-period Ts has passed from the timing of the start of the main period Tm, the digital value-generating portion 10a decrements the up/down counter by the first increment dD1 (step T7). Then, the digital value-generating portion 10a sums up the count of the fiducial value counter and the count of the up/down counter (step T8). The resulting sum value is delivered as a digital current value (step T9). In this way, in this case, the digital current value assumed during the ((n/2)+1)th sub-period Ts is smaller than the digital current value assumed in its center, or the n/2th sub-period Ts, by the first increment dD1.

Then, the digital value-generating portion 10a makes a decision as to whether the main period Tm has ended, i.e., the nth sub-period Ts has elapsed (step T10). If the nth sub-period Ts has not elapsed, the digital value-generating portion 10a goes to the step T7, in which the up/down counter is decremented by the first increment dD1. In this way, a digital current value that is smaller than the value assumed during the previous sub-period Ts by the first increment dD1 is created. On the other hand, if the nth sub-period Ts has passed, the digital value-generating portion 10a resets the up/down counter (step T11) and goes to the step T2, where the fiducial value counter is incremented by one for the next main period Tm.

As described thus far, in this second embodiment, the digital current value varies in such a pattern that it increases up to an intermediate point in the main period Tm and then decreases. Therefore, the digital current value assumed at the end of this main period Tm is equal to the digital current value assumed at the beginning of the next main period Tm. Consequently, generation of RF noise due to a difference between them can be suppressed. Therefore, a highly reliable vertical deflection circuit can be offered.

Third Embodiment

Figure 11:
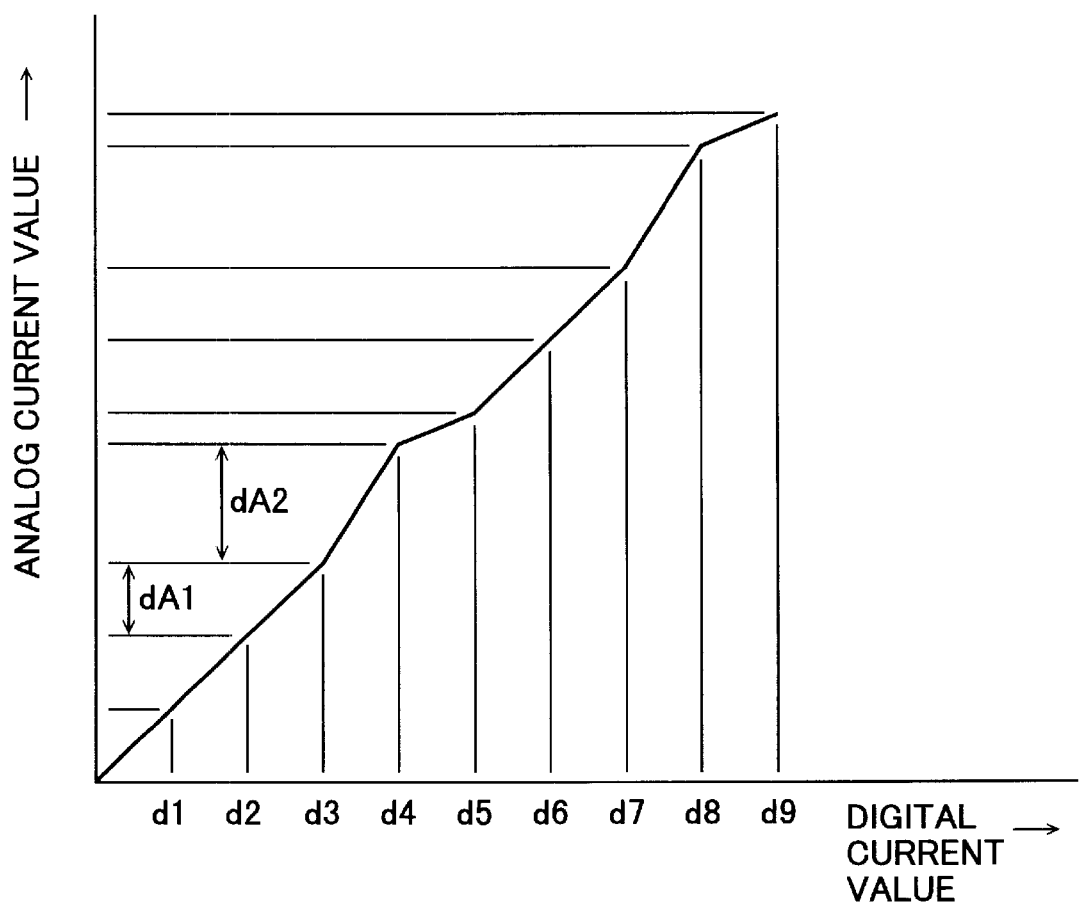
FIG. 11 is a diagram showing the input/output characteristics of a D/A converter applied to a third embodiment of the invention.

FIG. 11 is a graph illustrating the input/output characteristics of a D/A converter used in a third embodiment of this invention. In the first and second embodiments described above, the D/A converter 11 is taken as an example. This converter has input/output characteristics in which first range ΔD1 in which the gradient is steeper than the ideal characteristics and second range ΔD2 in which the gradient is milder appear alternately and periodically. In contrast, in this third embodiment, a D/A converter 11 having input/output characteristics having periodically distorted points from the ideal characteristics, i.e., periodic acnodes (isolated points), is taken as an example.

Some commercial products of the D/A converter 11 have characteristics which are distorted from the ideal characteristics according to the input digital value because of structural factors of the D/A converter. For example, if the digital current value is incremented with each main period Tm, the increment of the corresponding analog current value may be different from the increments of others only in cases of digital current values that are given multiples. For instance, only digital current values that are multiples of 4 (e.g., 4, 8, and 12) may give increments greater than heretofore.

Specifically, where the digital current values varies from d1 to d2, and where the digital current value changes from d2 and d3, the analog current value varies by ΔdA1. On the other hand, where the digital current value varies from d3 to d4, the analog current value varies by ΔdA2 that is greater than the above-described increment ΔdA1. This phenomenon occurs also where d8 that is twice of d4 is produced, for example.

In this case, the angular increment of the deflection angle of the electron beam in this portion differs from the increments in the other portions accordingly. The scanning line density differs from those in other portions accordingly. Consequently, fringe lines appear. Accordingly, the DSP 10 in accordance with this third embodiment produces a digital current signal in a pattern corresponding to the aforementioned isolated points to cope with the D/A converter 11 having such input/output characteristics.

Figure 12:
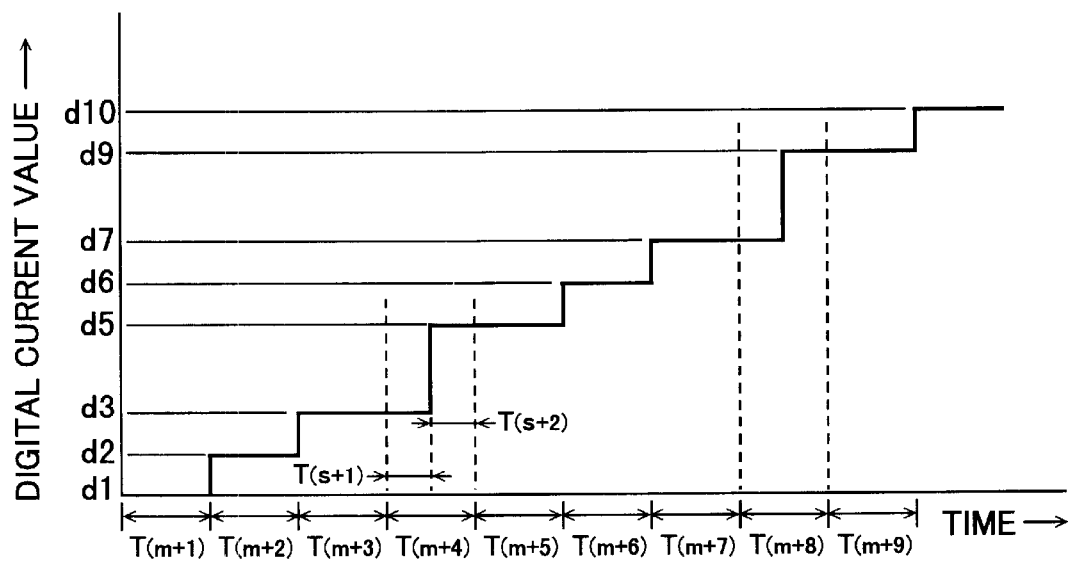
FIG. 12 is a diagram illustrating the configuration of a digital current signal in accordance with a third embodiment of the invention.

FIG. 12 is a diagram illustrating the configuration of a digital current signal in accordance with this third embodiment. The digital value-generating portion 10a of the DSP 10 in accordance with this third embodiment divides main periods into main periods Tm corresponding to periodic isolated points and other main periods Tm. The pattern in which the digital current signal is generated is varied between these two kinds of main periods Tm.

That is, the digital value-generating portion 10a generates corresponding one fiducial value as a digital current value during each main period Tm having no periodic isolated points. In this case, the fiducial value increments by second increment dD2 with each main period Tm. Specifically, where main periods corresponding to periodic isolated points are T(m+4) and T(m+8), digital current values d1, d2, d3, d5, d6, d7, and d9, for example, are generated during other main periods T(m+1), T(m+2), T(m+3), T(m+5), T(m+6), T(m+7), T(m+9), respectively.

During main periods Tm corresponding to periodic isolated points, plural fiducial values corresponding to main periods immediately before and after these main periods are generated as digital current values. More specifically, the digital value-generating portion 10a divides each main period Tm corresponding to periodic isolated points into plural sub-periods Ts, and generates fiducial values for main periods Tm immediately before and after this main period Tm as digital current values during the sub-periods Ts. For example, where the main period T(m+4) is a period corresponding to periodic isolated points, the digital current value d3 of the previous main period T(m+3) and the digital current value d5 of the next main period T(m+5) are generated during the first sub-period T(s+1) and during the second sub-period T(s+2), respectively, within this main period T(m+4).

Because of this structure, the output from the LPF 12 during each main period Tm corresponding to periodic isolated points corresponds to the average value of digital current values of the immediately before and after the main period Tm. Therefore, effects of the periodic isolated points can be circumvented, unlike the case in which the fiducial values of main periods Tm corresponding to periodic isolated points are directly delivered as digital current values. Consequently, scanning lines can be drawn uniformly. Hence, generation of stripe-like fringe pattern can be suppressed.

Figure 13:
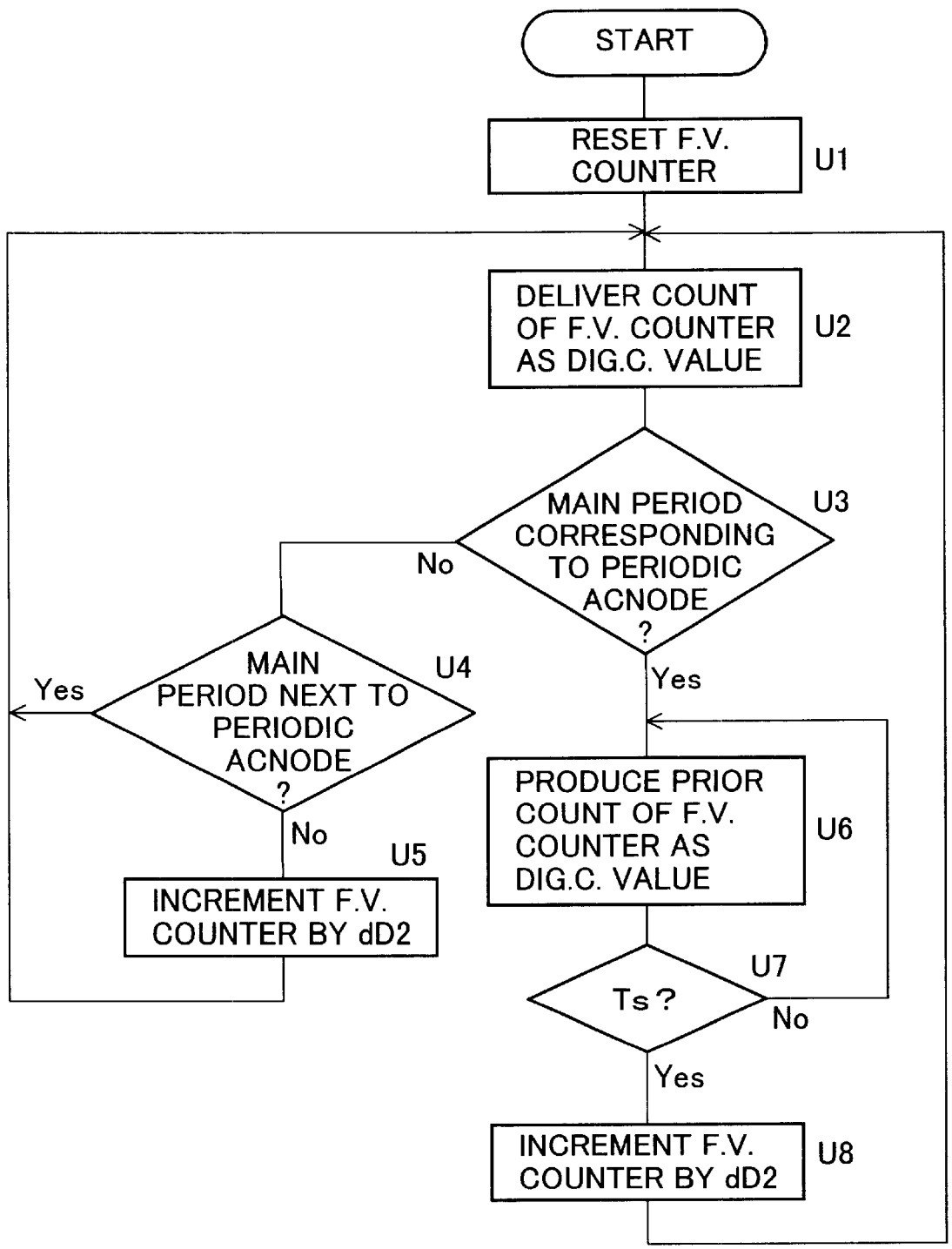
FIG. 13 is a flowchart illustrating the processing for creating the digital current signal in accordance with the third embodiment of the invention.

FIG. 13 is a flowchart illustrating processing for generating digital current signals by the digital value-generating portion 10a. The digital value-generating portion 10a responds at the timing of start of each main period Tm and resets the fiducial value counter (step U1). The count obtained by the fiducial value counter is delivered as the digital current value of this main period Tm (step U2).

At the timing of transition of the next main period Tm, the digital value-generating portion 10a makes a decision as to whether this main period Tm is a main period Tm corresponding to periodic isolated points (step U3). If it is not a main period Tm corresponding to periodic isolated points, the digital value-generating portion 10a makes a decision as to whether this main period Tm is a main period Tm next to the main period Tm corresponding to periodic isolated points (step U4). If this main period Tm is not a main period Tm next to the main period Tm corresponding to periodic isolated points, the digital value-generating portion 10a increments the fiducial value counter by second increment dD2 (step U5). The count of this fiducial value counter is delivered as the digital current value of this main period Tm (step U2).

If the main period Tm is a main period Tm corresponding to periodic isolated points, the digital value-generating portion 10a produces the digital current value as it is without incrementing the count of the fiducial value counter (step U6). That is, the digital value-generating portion 10a delivers the fiducial value of the previous main period Tm as a digital current value.

Then, the digital value-generating portion 10a makes a decision as to whether sub-periods Ts established in the main period Tm corresponding to the periodic isolated points have passed (step U7). If they have not passed, the digital value-generating portion 10a delivers a fiducial value corresponding to the previous main period Tm as a digital current value.

If the sub-periods Ts have passed, the digital value-generating portion 10a increments the count of the fiducial value counter by the second increment dD2 (step U8). The digital value-generating portion 10a returns to the step U2, where the count of the fiducial value counter is delivered as a digital current value. That is, the digital value-generating portion 10a delivers the fiducial value of the main period Tm next to the main period Tm corresponding to the periodic isolated points as a digital current value.

If the main period Tm is next to the main period Tm corresponding to the periodic isolated points, an affirmative decision is made in step U4. In this case, the digital value-generating portion 10a delivers the count of the fiducial value counter as it is without incrementing the fiducial value counter.

As described thus far, in this third embodiment, where the D/A converter 11 having input/output characteristics having period isolated points is utilized, the fiducial values for the main periods Tm immediately before and after a main period Tm having periodic isolated points are produced as digital current values. Accordingly, during this main period Tm, the analog current value delivered from the LPF 12 is the average value of the analog current values assumed during the main periods Tm immediately before and after the main period Tm having periodic isolated points.

Therefore, the vertical deflection current can be supplied to the vertical deflection coils 5 without being affected by periodic isolated points. Therefore, the vertical deflection angle of the electron beam EB can be varied in uniform angular increments. Consequently, the scanning line density can be made uniform. Hence, generation of stripe-like fringes can be suppressed. A high-quality image can be produced on the viewing screen.

Fourth Embodiment

In the first through third embodiments described above, a digital current signal to be generated by the DSP 10 is a signal varying in a given pattern. This causes the vertical deflection current to be varied in uniform increments. Consequently, the vertical deflection angle of the electron beam EB is varied in uniform angular increments. On the other hand, in this fourth embodiment, a contrivance is used in accessing the D/A converter 11 to vary the vertical deflection current in uniform increments, thus causing the vertical deflection angle of the electron beam EB to vary in uniform angular increments.

In this fourth embodiment, we have explored the cause of generation of distortion in the linearity of the input/output characteristics of the D/A converter 11. Access is gained to the D/A converter 11 while avoiding the found cause.

Figure 14:
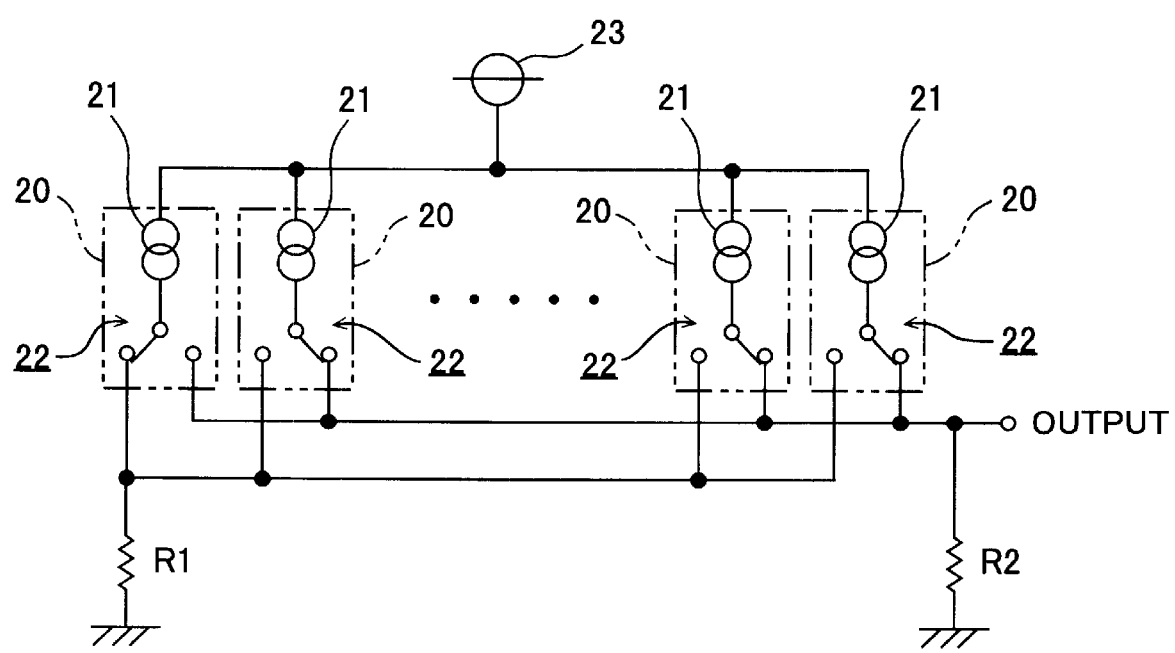
FIG. 14 is a conceptual diagram illustrating the principle of a D/A converter.

In particular, the present inventor has noticed the internal structure of the D/A converter 11. FIG. 14 is a diagram illustrating the principle of the structure of the D/A converter 11. The D/A converter 11 is made up of plural cells 20, each forming a unit structure. Each cell 20 has a constant current source 21 and a switch 22. The cells 20 are connected in parallel with a power supply 23. More specifically, each cell 20 can be connected either with a load resistor R1 or with a load resistor R2. The connection with either load resistor can be switched by the switch 22.

In this structure, the output from the D/A converter 11 assumes a value proportional to the number of cells 20 connected with the load resistor R2. In particular, let i be the constant current value through each cell 20. It is assumed that n cells 20 are connected with the load resistor R2. The current flowing through the load resistor R2 is given by i×n (A). As a result, the output voltage from the D/A converter 11 is given by R2×i×n (V).

Figure 15:
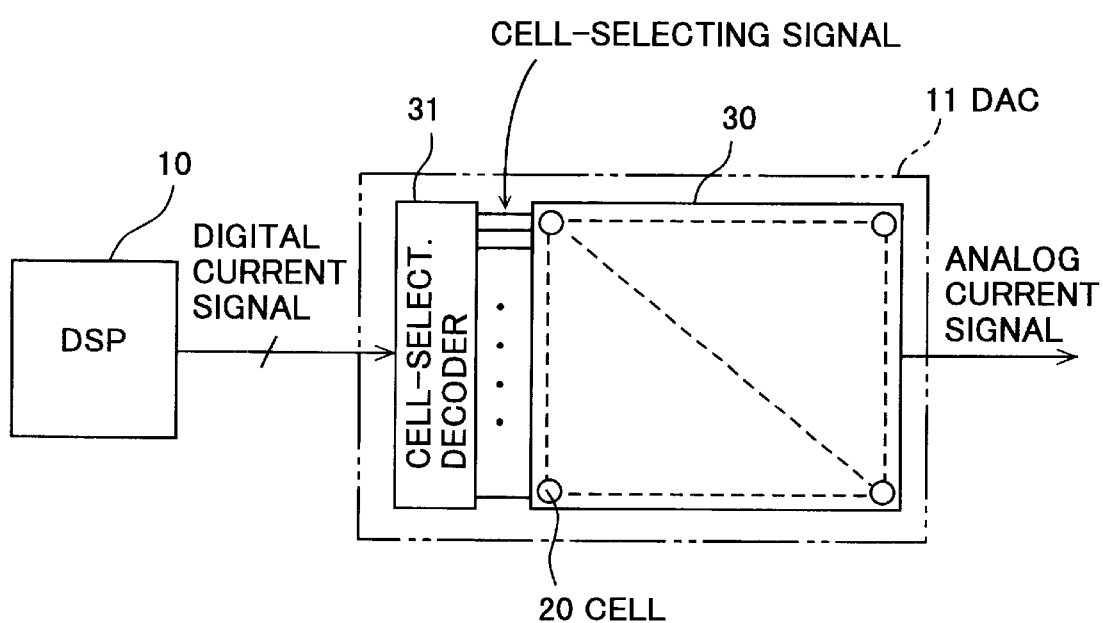
FIG. 15 is a block diagram showing the configuration of a D/A converter in accordance with a fourth embodiment of the invention.
Figure 18:
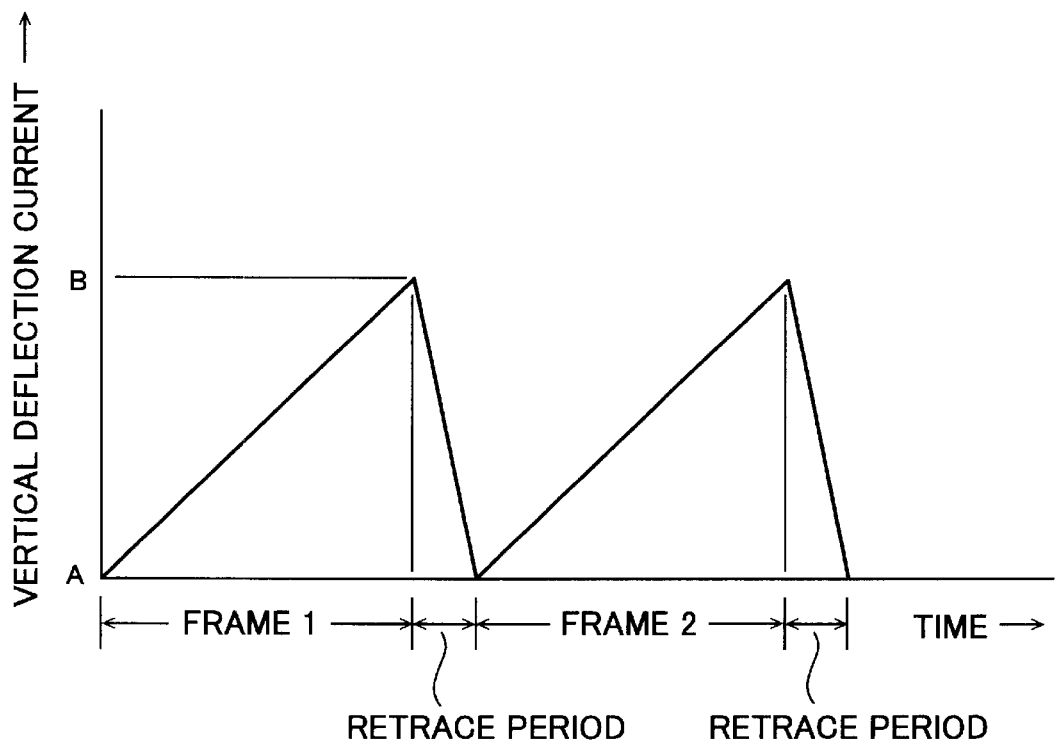
FIG. 18 is a diagram showing the waveform of a vertical deflection current.
Figure 19:
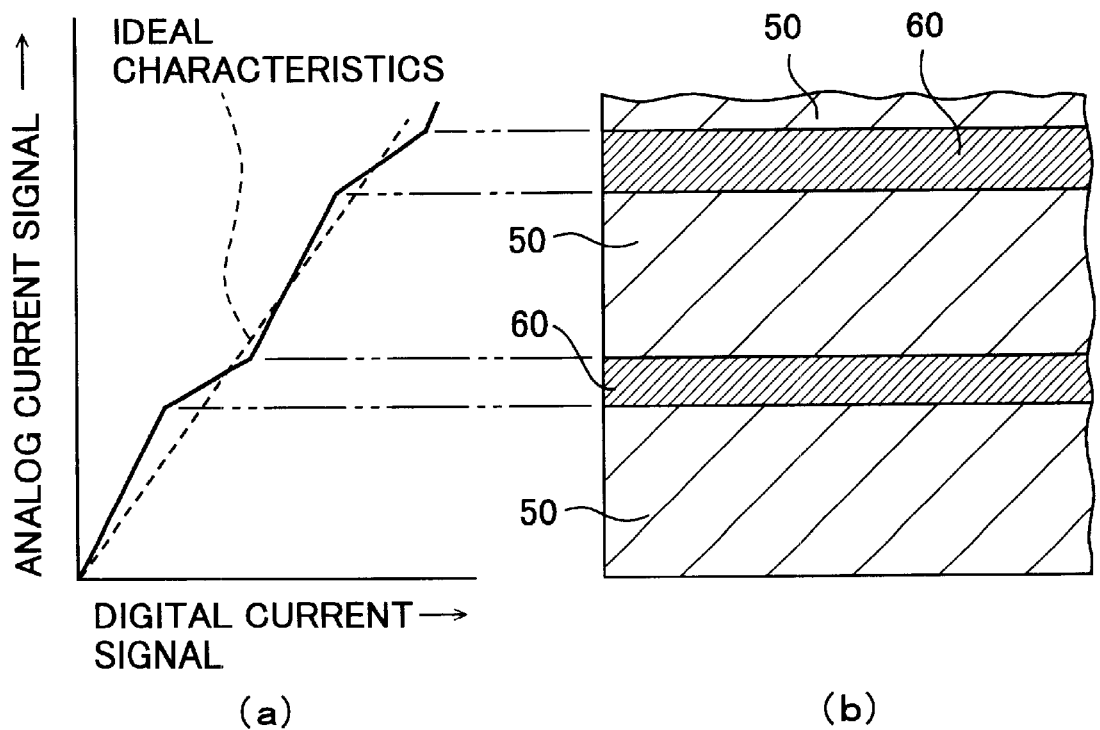
FIG. 19 is a diagram illustrating problems with the prior art vertical deflection circuit.

FIG. 15 is a circuit diagram illustrating the configuration of the D/A converter 11. This D/A converter 11 is equipped with a cell substrate 30 on which cells 20 are arranged in two dimensions. The cells 20 on the cell substrate 30 are arranged in j rows and k columns. The D/A converter 11 also includes a cell-selecting decoder 31 for selecting the cells 20.

The cell-selecting decoder 31 is electrically connected with the cells 20, receives the digital current value from the DSP 10, and produces a cell-selecting signal to the cells 20. The cell-selecting signal is used to select the cells 20 necessary to produce an analog current value corresponding to the aforementioned digital current value from the D/A converter 11.

FIG. 16 is a schematic diagram illustrating the configuration of the cell substrate 30. In this schematic diagram, the cells 20 are arranged in 32 rows and 8 columns, as an example. Where five cells 20 should be turned on, the cell-selecting decoder 31 selects the cells 20 (cell number 1 through 5) in the first row and in the first through fifth columns. As a result, the D/A converter 11 produces a voltage corresponding to the five cells as an analog current value. This method of selection does not differ between the prior art technique and the fourth embodiment.

Where nine or more cells 20 are turned on, i.e., where the number of cells 20 that are turned on is in excess of the number of the established columns, the cells are selected in a manner different from the prior art method. The prior art method is first described. Where nine or more cells 20 are turned on, the cell-selecting decoder 31 turns on all the cells 20 (cell number 1 through 8) in the first row as shown in FIG. 16(a). In addition, the decoder turns on the cell 20 (cell number 9) in the fourth row remote from the first row and in the first column. In this way, where two or more rows are selected by the prior art D/A converter 11, mutually spaced rows are selected rather than adjacent rows.

The reason why rows that are remotely spaced from each other are intentionally selected is as follows. The D/A converter used in the vertical deflection circuit is normally a general-purpose product rather than a dedicated vertical deflection circuit. Where it is used in a device other than a vertical deflection circuit, if distortion in the input/output characteristics of the D/A converter is unavoidable, the distortion is required to be made uniform as much as possible, for the following reason. Where various waveforms are produced, the ideal waveform is approached more closely in cases where small distortions are distributed uniformly than in cases where distortion is present locally. On the other hand, variations in characteristics among the cells cause distortion in the input/output characteristics of the D/A converter. Cells located closely show relatively similar characteristics, while cells remotely spaced from each other exhibit relatively dissimilar characteristics. Accordingly, if mutually remote cells are selected, the input/output characteristics of the D/A converter will be distorted. Therefore, in the prior art D/A converter, if two or more rows are selected, mutually remote rows are selected.

On the other hand, in the vertical deflection circuit 7 in accordance with the fourth embodiment, the output waveform is essentially a saw-toothed waveform. Preferably, the distortion in the D/A converter 11 is uniform between near previous and subsequent data items. Accordingly, in this fourth embodiment, even if cells of different rows are selected, cells are selected in turn from a cell that is adjacent to the previous row and adjacent to a cell which should be turned on last in the previous row.

More specifically, in the D/A converter 11 in accordance with this fourth embodiment, if nine cells should be turned on as shown in FIG. 16(b), for example, the cell-selecting decoder 31 turns on all cells 20 (cell number 1 through 8) in the first row and turns on one cell 20 (cell number 9) that is in the second row adjacent to the first row and in the last column, or the eighth column. If ten cells are turned on, the cell-selecting decoder 31 turns on all the cells 20 (cell number 1 through 8) in the first row and the cells 20 (cell number 9 and 10) in the seventh and eighth column in the second row. If 17 cells are turned on, the cell-selecting decoder 31 turns on all the cells 20 (cell number 1 through 8 and 9 through 16) in the first and second rows and the cell 20 (cell number 17) in the third row in the first column.

Where two or more rows of cells 20 are turned on in this way, adjacent cells 20 are turned on. Therefore, generation of a sudden change in the characteristics as encountered when the cells are physically isolated from each other as in the prior art technique can be suppressed. Accordingly, the input/output characteristics of the D/A converter 11 can be stabilized. That is, the input/output characteristics of the D/A converter 11 can be linearized.

Therefore, even if one digital current signal is delivered from the DSP 10 during each main period Tm, increments of the vertical deflection current can be made uniform. Consequently, the angular increments of the vertical deflection angle of the electron beam EB can be rendered uniform. This permits the scanning line density to be made uniform. Hence, high-quality image can be offered.

Furthermore, what is needed is only a clock signal used to measure the main periods Tm. Therefore, the whole circuit configuration of the vertical deflection circuit 7 can be made simpler than in the case where it is necessary to measure the sub-periods TS.

In the example described above, the cells 20 on the same row are successively selected. In summary, it is only necessary to select adjacent cells 20 in selecting cells 20, in order to linearize the input/output characteristics of the D/A converter 11. Accordingly, it is conceivable that the following access method is adopted.

FIG. 17 is a conceptual diagram illustrating another example of cell selection. As can be seen from FIG. 17, a cell-selecting decoder 31 in accordance with this example selects the cells 20 in such a way that the central one is selected first and that the selection goes coaxially. Even with this scheme, adjacent cells 20 are selected and so the input/output characteristics of the D/A converter 11 can be linearized.

In the example described above, one cell-selecting decoder 31 can select one cell 20 at a time. Of course, a row decoder for selecting a row and a column decoder for selecting a column may be provided, and cells 20 may be selected. In this case, when cells in different rows are selected, it is conceivable that cells in different rows are selected in turn. With this scheme, when a row containing cells 20 not selected is selected, only a column containing cells 20 to be selected can be selected by the column decoder.

Furthermore, a circuit for decoding a digital current value and making a decision as to whether the cell 20 itself is turned on or not may be incorporated in each cell 20. This circuit also acts to switch the cell 20 between on and off.

Other Embodiments

While some embodiments of this invention have been described thus far, the invention is not limited thereto.

For example, in the first through third embodiments described above, the digital current value forming a digital current signal can vary in increments of the first increment dD1. In the above description, only "1" is taken as an example of this increment. However, the first increment dD1 is not limited to "1" but rather it can be set to any arbitrary value.

For instance, the first increment dD1 of the digital current value may be 2 or greater integer. In this case, the number of sub-periods Ts obtained by dividing the main period Tm can be reduced and so a high-speed clock signal used to measure the sub-periods Ts can be dispensed with, unlike the case in which the value is incremented or decremented by one at a time.

Moreover, the first increment dD1 of the aforementioned digital current value may be a prime number such as 3 or 7.

In this case, it is assured that the cells forming the D/A converter 11 can be made nonuniform in characteristics. Therefore, if its average value is taken with each main period Tm, then it is assured that the average value can be varied linearly.

In the first through fourth embodiments described above, the DSP 10 is taken as an example of the means for generating a digital current signal. If importance should be placed on cost savings rather than high functionality, a digital current-generating circuit consisting of dedicated hardware may, of course, be used as the means for generating the digital current signal.

What is claimed is:

1. A vertical deflection circuit for generating a vertical deflection current supplied to vertical deflection coils that produce a magnetic field necessary to deflect an electron beam vertically, said vertical deflection circuit comprising:
   a digital value-generating portion for generating a digital current signal having plural different current values that determine the vertical deflection current during a predetermined main period in which a vertical deflection angle of the electron beam is varied;
   a digital-to-analog converter for converting the digital current signal generated by the digital value-generating portion into an analog current signal;
   a filter for extracting an average value of the analog current signal produced from the digital-to-analog converter; and
   a driver circuit for supplying a vertical deflection current corresponding to the average value of the analog current signal extracted by the filter to said vertical deflection coils.

2. The vertical deflection circuit of claim 1, wherein
   (A) the digital current signal is generated during every each main period established to form a frame,
   (B) each digital current signal shows plural digital current values which vary in an equal increment from a different value during each main period with each sub-period obtained by dividing each main period by n (where n is an integer equal to or greater than 2).

3. The vertical deflection circuit of claim 1, wherein said digital value-generating portion is a part of software function executed by a DSP (digital signal processor).

4. The vertical deflection circuit of claim 1, wherein each main period is a time taken to draw one scanning line.

5. The vertical deflection circuit of claim 2, wherein said digital current signal is a combination of a fiducial value varying in a given direction of change during each main period and plural variable values varying in said given increment with each sub-period described above.

6. The vertical deflection circuit of claim 5, wherein said fiducial value increments by one with each main period.

7. The vertical deflection circuit of claim 5, wherein said plural variable values increment by one with each sub-period.

8. The vertical deflection circuit of claim 5, wherein said plural variable values vary in said given increments in said given direction of change from the start of each main period to an intermediate point and vary in a direction opposite to said given direction of change from said intermediate point to end of each main period.

9. The vertical deflection circuit of claim 2, wherein said digital current signal has at least plural digital current values contained in a different output characteristics of the digital-to-analog converter.

10. The vertical deflection circuit of claim 9, wherein said digital current signal shows plural digital current values respectively in intervals of milder gradient and intervals of steeper gradient contained the input/output characteristics of the digital-to-analog converter.

11. The vertical deflection circuit of claim 1, wherein said digital value-generating portion includes:

a means for generating the digital current signal consisting of one digital current value during each main period other than predetermined main periods; and a means for generating the digital current signal showing the same two digital current values as two digital current values assumed during main periods immediately before and after, respectively, each of said predetermined main periods.

12. The vertical deflection circuit of claim 11, wherein said predetermined main periods are main periods during which the digital current value corresponding periodic isolated points should be produced provided that the input/output characteristics of the digital-to-analog converter has said periodic isolated points that are periodically distorted.

13. A vertical deflection circuit for generating a vertical deflection current supplied to vertical deflection coils that produce a magnetic field necessary to deflect an electron beam vertically, said vertical deflection circuit comprising:

a digital value-generating portion for generating and delivering a digital current signal having plural different current values that determine the vertical deflection current during a predetermined main period in which a vertical deflection angle of the electron beam is varied;

a digital-to-analog converter for converting the digital current signal generated by the digital value-generating portion into an analog current signal, said digital-to-analog converter including plural cells arranged in two dimensions and capable of being switched on and off and a cell-selecting means for producing a cell-selecting signal for selecting adjacent ones of the cells when a necessary number of cells are turned on based on the digital current value contained in said digital current signal;

a filter for extracting an average value of the analog current signal produced from the digital-to-analog converter; and a driver circuit for supplying a vertical deflection current corresponding to the average value of the analog current signal extracted by the filter to said vertical deflection coils.

14. A processor for use in a vertical deflection circuit for supplying a vertical deflection current to vertical deflection coils, said vertical deflection circuit including a digital-to-analog converter for converting a digital current signal into an analog current signal, said vertical deflection circuit further including a filter for extracting an average value of the analog current signal produced from said digital-to-analog converter, said vertical deflection current corresponding to said average value, said processor comprising:

a digital value-generating means for generating and delivering a digital current signal during a predetermined main period which a deflection angle of an electron beam is varied, said digital current signal showing plural digital current values which determine said vertical deflection current, respectively.

15. A CRT display comprising:

an electron gun for emitting an electron beam;

vertical deflection coils for producing a vertical magnetic field necessary to deflect said electron beam vertically;

a vertical deflection circuit for producing a vertical deflection current to be supplied to the vertical deflection coils to produce the magnetic field;

horizontal deflection coils for producing a horizontal magnetic field necessary to deflect said electron beam horizontally;

a horizontal deflection circuit for producing a horizontal deflection current to be supplied to the horizontal deflection coils to produce the magnetic field;

a display portion on which scanning lines are drawn by the electron beam having a direction of travel that is deflected in two dimensions by the magnetic fields produced by said vertical deflection coils and said horizontal deflection coils, respectively;

said vertical deflection circuit having a digital value-generating portion for producing the digital current signal, a digital-to-analog converter for converting the digital current signal produced by said digital value-generating portion into an analog current signal, a filter for extracting an average value of the analog current signal produced from said digital-to-analog converter, and a driver circuit for supplying a vertical deflection current corresponding to the average value of the analog current signal extracted by said filter to said vertical deflection coils; and said digital value-generating portion acting to produce a digital current signal having plural different current values that determine the vertical deflection current respectively during a predetermined main period in which a vertical deflection angle of the electron beam is varied.

* * * * *